Patented Mar. 2, 1937

2,072,797

UNITED STATES PATENT OFFICE 2,072,797

NUCLEAR HALOGENATED MIXED ETHERS AND PROCESS FOR PRODUCING THE SAME

Frank M. Clark and Walter M. Kutz, Pittsfield, Mass., assignors to General Electric Company, a corporation of New York No Drawing. Application July 20, 1935, Serial No. 32,432

10 Claims. (Cl. 260—150)

This application is a continuation-in-part of our prior application, Serial No. 741,147, filed August 23, 1934. Our invention relates to nuclear halogenated aryl-alkyl ethers, the term "nuclear" being used to designate aryl-alkyl products in which halogen replaces hydrogen in the aryl nucleus. It is the object of our invention to produce ether-type compounds which are liquid over a wide range of temperatures, are chemically stable, have a high dielectric constant and have other superior electrical properties. Such compounds, when containing a sufficiently high halogen content, are noninflammable or, what is even more to be desired, are capable of evolving only noninflammable gas mixtures upon decomposition. These and other characteristics render such compounds particularly well suited for various electrical uses as will hereinafter more fully appear. Our invention includes also a process of making such compounds.

Nuclear halogenated aryl-alkyl ether compounds may be made in accordance with our invention by causing aryl halogenated compounds to react with aliphatic alcohols. In accordance with a preferred method, a mixture of such compounds is heated in a closed space in the presence of an alkali and in the presence of a cupreous reagent capable of promoting a condensation reaction in which an alcohol and a halogenated aryl compound are caused to condense by the splitting off of nuclear halogen. While the temperature at which the reaction is carried out may be varied considerably, we have found a temperature within the range of 210 to 260° C. to be satisfactory.

The following is an example of such a reaction whereby trichlor phenyl ethyl ether is prepared, the ingredients being heated in an autoclave at 260° C. for about four hours:

Example 1

| | Parts |
|---|---|
| 1-, 2-, 4-, 5-, tetrachlorbenzene | 200 |
| 95% ethyl alcohol | 200 |
| Sodium hydroxide | 40 |
| Cuprous chloride | 1 |

During the heating the reacting mixture is stirred, or otherwise agitated, in order to promote the reaction. The following type of condensation reaction occurs:

As by-products of the formation of chlorinated ether reaction, there also are formed sodium chloride and phenols. The sodium chloride is removed by filtration and the filtrate is diluted with three or four volumes of water in order to extract the uncombined sodium hydroxide and the alkali soluble phenols. The liquid nuclear chlorinated mixed ether which is formed will collect at the bottom of the vessel and may be drawn off. The ether finally is purified by fractional distillation. The liquid product has the following characteristics:

| | |
|---|---|
| Viscosity @ 15° C | 47 seconds |
| Viscosity @ 37.8° C | 36 seconds |
| Viscosity @ 100° C | 31 seconds |
| Specific gravity at 15.5 (referred to water at 15.5° C.) | 1.416 |
| Refractive index at 25° C | 1.5650 |
| Color | Water white |
| Reaction | Neutral |
| Boiling range at atmospheric pressure | 245 to 285° C. |
| Pour point | Minus 17° C. |
| Burn point | 250° C. |

The product is chemically stable, is not corrosive, and shows no form of chemical reactivity in contact with aluminum even when heated at 100° C. for periods of 50 days or more. The described compound has a molecular weight of 224 and a chlorine content of 47% by weight. These figures are very close to the figures theoretically required for trichlor phenyl ethyl ether $$(C_6H_2Cl_3-O-C_2H_5).$$

Such product has superior dielectric and insulating characteristics and has a high dielectric constant over a wide range of temperature, the following being given as examples:

| Temperature | Dielectric constant |
|---|---|
| 25° C. | 6.1 |
| 50° C. | 5.5 |
| 75° C. | 5.2 |
| 100° C. | 5.0 |

The dielectric strength is 30 kilovolts, or higher, as measured in a 1/16" gap at room temperature. The electrical resistivity is high, being at least as high as $25 \times 10^{10}$ ohms per centimeter cube at 25° C. tested under 500 volts direct current.

Because of its superior dielectric properties (the dielectric constant being more than double that of mineral oil), the chlorinated mixed ether can to advantage be used in electric capacitors, electric cables, bushings, switchgear apparatus, electric transformers, and the like. Superiority of the product is illustrated by the following:

A capacitor made with aluminum foil electrodes separated by two sheets of .0004 inch kraft paper and containing 2.68 sq. ft. of active electrode surface, when impregnated with mineral oil, has a capacity of about .30 microfarad. When impregnated with the above described mixed ether compound, it has a capacity of .49 microfarad. Expressed in terms of the area of electrode surface necessary to produce a capacity of one microfarad, we find that an oil impregnated capacitor requires approximately 7 sq. ft. of surface while a capacitor impregnated with the above described new mixed ether compound requires only approximately 4.65 sq. ft. of surface. The aryl-alkyl ether capacitor has a power factor of approximately .5% when tested at 110 volts alternating current.

In the formation of the halogenated aryl-alkyl ether, best yields are obtained when a molecular ratio of the halogenated aromatic compound and sodium hydroxide are used. Approximately molecular amounts were involved in the foregoing preparation of the above described trichlor phenyl ethyl ether. When, however, the relative amount of alkali used in the reaction is increased a reduction reaction takes place at the same time as the reaction leading to the formation of the mixed ether so that the product obtained contains less halogen. This will be illustrated by the following example, in which the molecular ratio of alkali to tetrachlorbenzene is approximately 2.7 to 1.

*Example 2*

| | Parts |
|---|---|
| 95% ethyl alcohol | 200 |
| 1-, 2-, 4-, 5-, tetrachlorbenzene | 150 |
| Sodium hydroxide | 75 |
| Cuprous chloride | 1 |

This reaction mixture is heated to approximately 260° C. for four hours in an autoclave. The container then is cooled to room temperature and the reaction mixture is separated and purified in the same manner as described in the first example. This modified product has a lower molecular weight than the trichlor phenyl ethyl ether above described and also a lower chlorine content. Its molecular weight averages 211 and the chlorine content 42.7%. The properties of the product made by this reaction are as follows:

| | |
|---|---|
| Viscosity @ 15° C | 47 seconds |
| Viscosity @ 37.8° C | 36 seconds |
| Viscosity @ 100° C | 31 seconds |
| Gravity at 15.5 (referred to water at 15.5° C.) | 1.38 |
| Refractive index at 25° C | 1.5580 |
| Color | Water white |
| Reaction | Neutral |
| Boiling range at atmospheric pressure | 230 to 275° C. |
| Pour point | Minus 45° C. |
| Burn point | 240° C. |
| Molecular weight | 211 |
| Chlorine content | 42.7 |

This product is chemically stable and is inert in contact with aluminum even when heated to 100° C. for periods in excess of 50 days. The characteristics of the product indicate a probable mixture of nuclear dichlor and trichlor phenyl-ethyl ether.

The low pour point and low viscosity of the second product render it well adapted for the same electrical uses as the trichlor phenyl-ethyl ether previously described. Its electrical properties are even superior to those of the first product. Its dielectric constant is higher being as follows at different temperatures:

| Temperature | Dielectric constant |
|---|---|
| 25° C. | 6.9 |
| 50° C. | 6.6 |
| 75° C. | 5.8 |
| 100° C. | 5.5 |

A rolled capacitor containing 2.28 sq. ft. of active foil surface and an absorbent dielectric of two sheets of .0004 kraft paper has a capacity value of .5 microfarad. A capacitor so produced has a power factor of 1% at 110 volts. These characteristics are well adapted for capacitors intended for continuous low voltage duty, intermittent higher voltage duty, or for direct current circuits.

Other compounds of benzene may be employed as illustrated by the following examples:

*Example 3*

A mixture of the following ingredients is heated in an autoclave while stirring, to about 260° C. for about four hours. The ratio of alkali to the chlorinated benzene is approximately equimolecular.

| | Parts |
|---|---|
| Ethyl alcohol (95%) | 200 |
| Para-dichlorbenzene | 75 |
| Sodium hydroxide | 20 |
| Cuprous chloride | 1 |

A liquid chlorinated aryl-alkyl ether is obtained having a refractive index of approximately 1.5400.

*Example 4*

Again using approximately equimolecular proportions of alkali a mixture such as given below is heated in an autoclave at 240 to 260° C. for about four hours. The manufacture of the trichlorbenzene ingredient is described in Clark U. S. Patent 1,944,730, patented January 23, 1934.

| | Parts |
|---|---|
| Trichlorbenzene (isomeric mixture) | 200 |
| Ethyl alcohol (95%) | 200 |
| Sodium hydroxide | 45 |
| Cuprous chloride | 1 |

A liquid chlorinated alkyl-aryl ether product having the following characteristics is obtained:

| | |
|---|---|
| Refractive index at 25° C | 1.5510 |
| Specific gravity at 15.5/15.5°C | 1.35 |
| Pour point | Minus 55° C. |
| Distillation range 120 to 140° C. at 25 mm. of mercury pressure. | |
| Distillation range 230 to 240° C. at 1 atmosphere. | |

The previously described products may be blended with other chlorinated compounds, as for example with trichlorbenzene or with chlorinated diphenyl.

The liquids useful as dielectric materials and as lubricants also may be obtained by mixing products of the various examples therein stated. For example, a material produced in accordance with Example 4 may be blended with a material produced in accordance with Example 1. The pour point of a mixture thus produced falls as the proportion therein of the product of Example 4 is increased as may be seen from the following tabulation:

| Percentage of product of Example 4 by weight | Pour point |
|---|---|
| Percent | |
| 0 | −17 |
| 20 | −28 |
| 30 | −35 |
| 40 | −42 |
| 50 | −47 |
| 100 | −55 |

The method above described may be applied to chlorinated aryl compounds other than chlorinated benzene. This is illustrated by the following example:

*Example 5*

| | Parts |
|---|---|
| Methyl alcohol | 200 |
| Polychlorinated diphenyl (about 60% chlorine by weight) | 190 |
| Sodium hydroxide | 20 |
| Cuprous chloride | 1 |

In this example the amount of alkali is in substantially equimolecular proportions with respect to the amount of chlorinated diphenyl. The ingredients should be heated in an autoclave to about 250 to 260° C. for about eight hours and stirred during the heating. The reaction product, when cooled to room temperature, is purified in accordance with standard procedure. The condensation product from this reaction after having been washed of water soluble materials has a boiling point of about 265 to 290° C. at 25 millimeters pressure. It is a thick, viscous liquid and is straw yellow in color.

The following is an example of reaction carried out involving methyl alcohol and a benzene compound.

*Example 6*

| | Parts |
|---|---|
| Methyl alcohol | 250 |
| Trichlorbenzene (isomeric mixture) | 180 |
| Sodium hydroxide | 40 |
| Cuprous chloride | 1 |

The alkali in this example is used in equimolecular amounts as compared to the benzene compound. The mixture is heated in an autoclave at 260° C. for about four hours while stirring. The product is handled in accordance with the already described procedure. From this reaction is obtained a liquid boiling in a range of about 120 to 140° C. under 25 millimeters pressure and having an average refractive index of 1.5280 at 25° C.

In the two previous examples, methyl alcohol has been used, whereas in other examples ethyl alcohol has been employed. It should be understood that our invention may be carried out similarly with other alcohols higher in the series than ethyl alcohol.

*Example 7*

When hexachlorbenzene is employed as the aromatic reacting ingredient, we prefer to employ absolute ethyl alcohol as the aliphatic reacting ingredient.

A good yield is obtained from the following reaction mixture (the parts given being by weight):

| | Parts |
|---|---|
| Hexachlorbenzene | 142 |
| Ethyl alcohol (absolute) | 200 |
| Sodium hydroxide | 20 |
| Cuprous chloride | 1 |

The mixture is heated in an autoclave for four hours at 210 to 220° C. The product obtained is washed with water. A good yield of an alkali-insoluble product is obtained which is liquid and has a boiling point of 280 to 310° C. under atmospheric conditions. Fractionated, the alkali-insoluble product obtained gave the following yield:

| | Parts |
|---|---|
| Boiling from 260 to 295° C | 10 |
| Boiling from 295 to 305° C | 90 |
| Boiling from 305° C | 5 |

The product boiling from 295 to 305° C. is a liquid having a chlorine content of about 58% and having the following properties:

| | |
|---|---|
| Specific gravity at 15.5° C | 1.56 |
| Refractive index at 25° C | 1.58 |
| Pour point | minus 30° C. |
| Viscosity | 53 seconds at 37.8° C. |
| Dielectric constant at 25° C | 5.1 |

The product is believed to be a mixture of aryl-alkyl ethers containing four and five chlorine atoms in the aryl nucleus.

In place of absolute ethyl alcohol, other alcohols such as methyl and propyl alcohol may be used in the water-free (absolute) state.

In place of halogen derivatives of benzene and diphenyl, we may likewise use halogen derivatives of naphthalene, anthracene, diphenyl benzene, or other halogenated phenyl or polyphenyl compounds.

Our halogenated aryl-alkyl ether compound may be admixed with various other materials, such for example, as oils of various kinds, including oils of mineral, vegetable, fish, or animal oil origin. For example, chlorinated aryl-alkyl ether compounds may be admixed with mineral hydrocarbon oil such as used for cooling transformers. In the same manner the mixed halogenated ether compounds may be used in combination with other more viscous halogenated dielectric materials as for example halogenated diphenyl compounds. As an example 50 to 60% by weight of halogenated diphenyl containing from 40 to 65% chlorine may be mixed with 50 to 40% of either of the chlorinated phenyl ethyl ether compounds above described with the production of a nonviscous, high dielectric strength liquid well suited for transformer or other dielectric use. In a similar manner, other chlorinated phenyl compounds, as for example, chlorinated diphenyl methane, chlorinated naphthalene, chlorinated diphenyl ethane, chlorinated diphenyl ketone, and the like, may be mixed with these aryl-alkyl ether compounds.

Chlorinated aryl-alkyl ethers as described in this application possess desirable lubricating characteristics. Particularly favorable results are obtained in the use of these products alone or in oil mixture as extreme pressure lubricants. In many applications, the amount of the halogenated aryl-alkyl ether may be as low as 2 to 5% by weight in a liquid carrier such as mineral lubricating oil.

In carrying out the process of manufacture outlined we have confined our illustrations to reactions employing sodium hydroxide. To one skilled in the art, it is obvious that other hydroxides or basic materials can be used. Thus we have used potassium hydroxide and calcium hydroxide. The best results, however, are obtained with the use of basic reagents soluble in the alcohol present.

While our process is limited in the illustrations given to chlorinated aryl compounds, other halogens as bromine, iodine, or fluorine may be substituted in theoretically equivalent amounts for chlorine.

What we claim as new and desire to secure by Letters Patent of the United States is:

1. A liquid insulating and dielectric material consisting of compounds in which a chlorinated aryl nucleus and an alkyl group are united to one another by oxygen, said material having a pour point of about minus 45° C. and a viscosity of 47 seconds at about 15° C.

2. An insulating and dielectric material comprising mainly liquid nuclear halogenated phenyl ethyl ether, said material having a solidification temperature as low as minus 17° C., having a specific gravity of about 1.4, having a viscosity of about 47 seconds at 15° C., and being characterized by chemical stability, a dielectric constant of 6.1 at 25° C. and an electrical resistivity at least as high as $25 \times 10^{10}$ ohms per centimeter cube at 25° C.

3. A liquid insulating and dielectric material which is liquid at temperatures as low as minus 17° C., has a high dielectric constant, high resistivity and chemical stability and consists of compounds containing an aryl nucleus and an alkyl group which are united to one another by oxygen, said aryl nucleus containing combined halogen.

4. A liquid dielectric material containing as an essential and substantial ingredient a compound having an aryl nucleus and an alkyl group which are united to one another by oxygen, said aryl nucleus containing at least four chlorine atoms, said product having a pour point as low as minus 30° C. a viscosity of about 53 seconds at 37.8° C. and a dielectric constant at least as high as 5.

5. The process which consists in heating to a temperature of reaction in a closed space a mixture of polychlorinated benzene, a substantially anhydrous alcohol, a minor proportion of copper chloride and an alkali and after reaction separating from the reaction products an arylalkyl ether, the aryl nucleus of which contains chlorine.

6. The process which consists in heating in a closed space to a temperature at least as high as 210° C. hexachlor benzene, an absolute monohydric alcohol, cuprous chloride and an alkali hydroxide thereby producing a chlorinated mixed ether.

7. The process which consists in heating to a temperature of about 210 to 260° C. in a closed space a mixture of a polychlorinated benzene, a monohydric alcohol, a minor proportion of cuprous chloride and an alkali hydroxide.

8. The process which consists in heating for several hours to about 210 to 260° C. in a closed space a mixture of a tetrachlor benzene, ethyl alcohol, sodium hydroxide and a cupreous catalyzer to produce a nuclear chlorinated mixed phenyl ethyl ether, and separating said ether from unreacted ingredients and by-products.

9. The process which consists in heating to reaction temperature in a closed space a mixture of polychlorinated benzene, a monohydric alcohol, copper chloride and an alkali hydroxide, the latter reagent being present in an amount in excess of molecular ratio over the chlorinated benzene.

10. The process which consists in heating to a temperature of about 260° C. a mixture comprising by weight about 150 parts of a tetrachlor benzene, 200 parts ethyl alcohol, 75 parts sodium hydroxide and a minor proportion of a reaction-promoting cupreous catalyzer, such heating being continued until a nuclear chlorinated mixed phenyl ethyl ether has been formed.

FRANK M. CLARK.
WALTER M. KUTZ.